United States Patent [19]

Darder-Alomar

[11] Patent Number: 5,562,364
[45] Date of Patent: Oct. 8, 1996

[54] PROTECTIVE FENDER FOR DOCK POSTS

[76] Inventor: Antonio Darder-Alomar, 5101 S. Flagler Dr., West Palm Beach, Fla. 33405

[21] Appl. No.: 379,801

[22] Filed: Jan. 26, 1995

[51] Int. Cl.⁶ .................................................. E02B 3/26
[52] U.S. Cl. .......................... 405/215; 114/219; 405/211; 405/212
[58] Field of Search ............................ 114/219; 405/211, 405/212, 215; 404/6; 256/13.1

[56] References Cited

U.S. PATENT DOCUMENTS

| | | | |
|---|---|---|---|
| 4,227,832 | 10/1980 | Leone et al. | 405/215 |
| 5,007,363 | 4/1991 | James | 114/219 |

Primary Examiner—Dennis L. Taylor
Assistant Examiner—Pamela A. O'Connor
Attorney, Agent, or Firm—J. Sanchelima

[57] ABSTRACT

The protective fender includes a cushion body that has the shape of an elongated longitudinally cut half cylinder with an inner and an outer surface. The two edges of the inner surfaces include each a slap member that extends therefrom and embraces the dock posts. The slaps can be tailored to avoid the deck when embracing the posts so that a sufficiently large area above and below the deck can be protected to account for tide changes. Different embodiments for the fastening assemblies used can be implemented with laces, Velcro pads or snap buttons, all intended to keep the cushion body along the post at a position between the post and the approaching boat. The fender can be readily removed, when required.

8 Claims, 2 Drawing Sheets

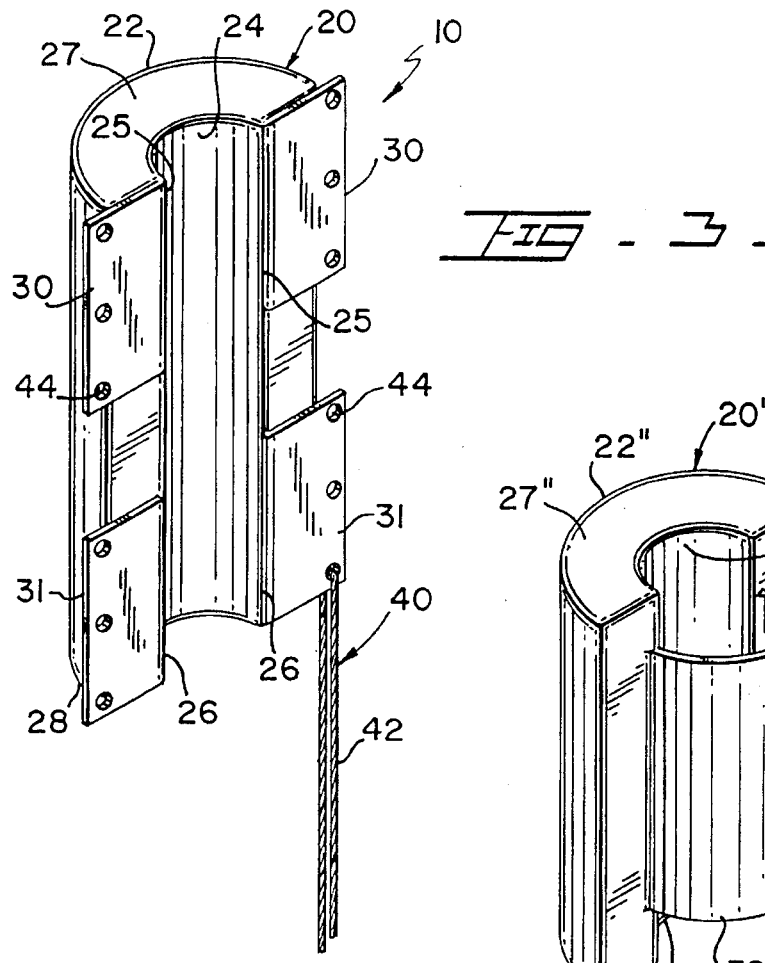
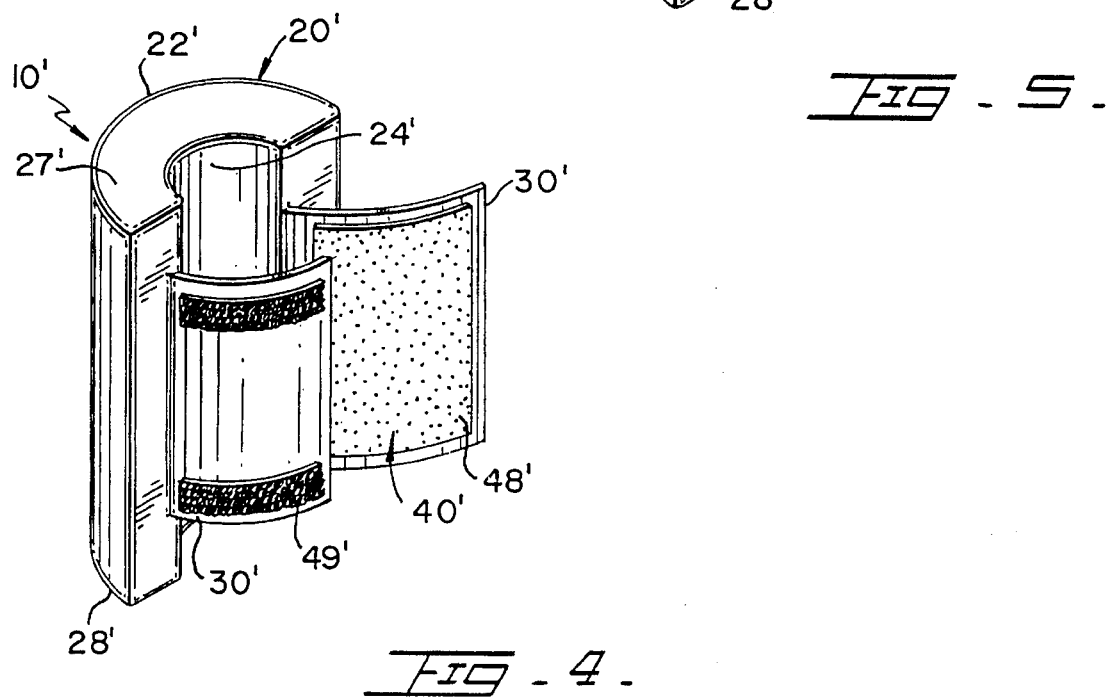

PROTECTIVE FENDER FOR DOCK POSTS

BACKGROUND OF THE INVENTION

1. Field of the Invention.

The present invention relates to a protective fender for dock posts, and more particularly, to the type that wraps around the marine dock posts.

2. Description of the Related Art.

Many different designs of fenders exist today. However, none of them provides the features of the present invention, including their ready installation and removal, increased protection and their aesthetic appeal. Typically, dock fenders are permanently mounted to dock structures, mostly to the posts that support the dock. Many times this protection is not sufficient or compatible with the vessels that use those docks, specially when this is done on a temporary basis (i.e.,renting a dock space seasonally). Installation of conventional permanent fenders is an investment that most temporary users are not inclined to make. Removing the conventional fender fixtures is impractical. These problems enhance the need for effective protection of today's luxurious vessels with fenders tailored to their needs.

SUMMARY OF THE INVENTION

It is one of the main objects of the present invention to provide a fender that protects vessels from the posts and other structures found in docks.

It is another object of this invention to provide a protecting fender that is portable, easy to install and remove from the location where it is being used.

It is still another object of the present invention to provide a protecting fender that is compatible with different types of dock posts and neighboring structures.

It is yet another object of this invention to provide such a fender that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an isometric view from the top of the fender shown in FIG. 2. This protective fender has a lace member that passes through several openings, to fasten the fender to the post.

FIG. 4 is a representation of an alternate embodiment for invention with Velcro straps.

FIG. 5 is a representation of a second alternate embodiment for invention with several snap buttons.

DETAILED DESCRIPTION OF THE PREFERRED EMBODIMENT

Figure 1:
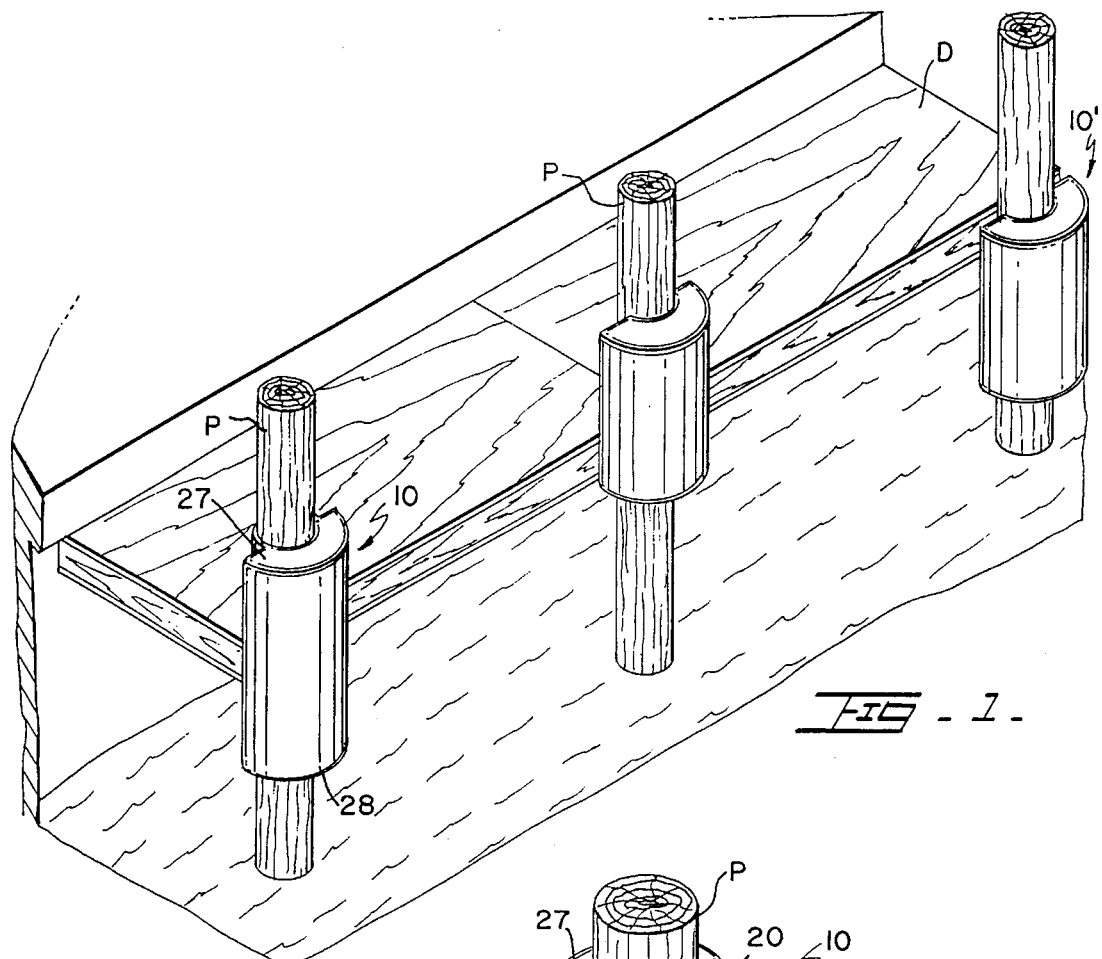
FIG. 1 represents an isometric illustration of a part of a marine dock wherein the present invention is used.

Referring now to the drawings, where the present invention is generally referred to with numeral 10, it can be observed that it basically includes cushion elongated body 20 and slaps 30 with fastening mechanism 40 corresponding to lace members 42. Two alternate embodiments 10' and 10" are shown in FIGS. 4 and 5, respectively. Fastening mechanism 40' corresponds to Velcro pads or straps 48' and 49' in alternate embodiment 10'. Similarly, fastening mechanism 40" includes snap buttons 41" and 43" that are cooperatively located to provide a snug embrace to post P.

Figure 2:
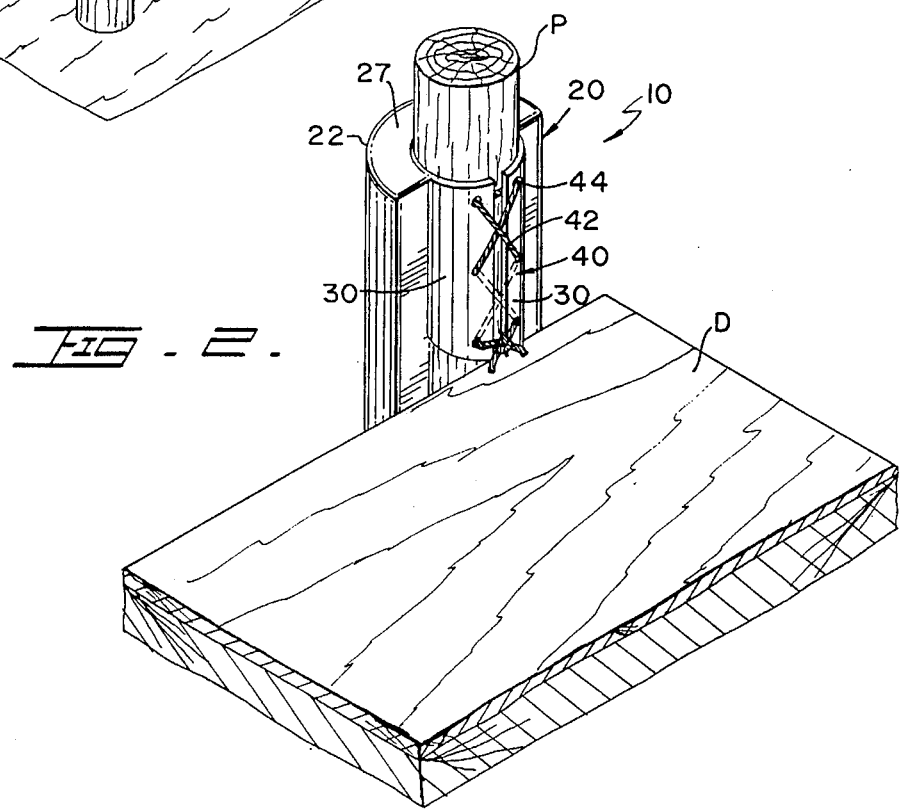
FIG. 2 shows a partial isometric view from the upper portion of a protective fender covering a dock post, as seen from the rear of the installed fender in FIG. 1.

Body 20 of fender 10, in the preferred embodiment, has upper and lower ends 27 and 28, outer and inner surfaces 22 and 24. Outer surface 22 comes in direct contact with an approaching boat or vessel, and protects the boat from marine dock posts P, which support platform or deck D. In this manner, the boats are not exposed to hard impacts against dock posts P and other neighboring structures. Inner surface 24 directly covers dock post P and from its ends 25 and 26 extend slaps 30 and 31, respectively. Upper and lower slaps 30 and 31, in the preferred embodiment shown in FIGS. 2 and 3, have several openings 44 through which lace members 42 pass, thereby fastening protective fender 10 to dock post P, as is seen in FIGS. 1, 2 and 3. Slaps 30 and 31 can be tailored to avoid the deck when embracing the posts so that a sufficiently large area above and below the deck can be protected to account for tide changes.

In FIG. 4, first alternate embodiment 10' is shown. Embodiment 10' has body 20' with upper and lower ends 27' and 28'. Fastening mechanism 40' comprises Velcro pads 48' and 49' corresponded to the loop and hook types, and they are cooperatively mounted on slaps 30'. Slaps 30' extend from the ends of inner surface 24' of body 20', cooperatively embracing post P.

In FIG. 5, alternate embodiment 10" is shown. Embodiment 10" has body 20" with upper and lower ends 27" and 28". Slaps 30", in the second alternate embodiment shown, has several snap button assemblies defining fastening mechanism 40". Button assemblies include a corresponding plurality of male and female snap button members 41" and 43", that are cooperatively mounted substantially at the edge of slaps 30". As in the preferred and first alternate embodiments 10 and 10', inner surface 24" and embracing slaps 30" cover dock post P. Outer surfaces 22' and 22", as surface 22 in the preferred embodiment 10, come in direct contact with an approaching boat or vessel.

Protective fenders 10; 10' and 10" are, preferably, made out of a flexible plastic material. Bodies 20; 20' and 20" are, preferably, elongated half cylinders with a longitudinal coextensive concave wall that defines inner surfaces 24; 24' and 24". Bodies 20; 20' and 20" can be hollow and filled with air or solid foam or any spongy material. Any material that can absorb the shock of the embarkation against dock posts P can be used.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fender for protecting approaching vessels from hitting dock structures including a plurality of posts supporting a deck, comprising:

elongated cushion means having an upper and lower ends, and outer and inner surfaces wherein said elongated cushion means have a semi-cylindrical shape with a longitudinal coextensive concave wall corresponding to said inner surface;

slap members extending from said inner surface and having cooperative dimensions to embrace one of said posts and causing said elongated cushion means to be coaxially disposed with respect to said post and secured thereto between said post and said approaching vessels and wherein said slap members are designed to avoid said deck when embracing said post; and means for fastening said slap members so that said elongated cushion means is kept at a predetermined position on said post.

2. The fender set forth in claim 1, wherein said means for fastening said slap members include lace means and said slap members include a plurality of cooperatively positioned openings that permit the passing of said lace means through thereby fastening said slap members together and against each other embracing said post.

3. The fender set forth in claim 1, wherein said means for fastening said slap members includes Velcro pads that cooperatively engage with each other thereby fastening said slap members together and against each other embracing said post.

4. The fender set forth in claim 3 wherein said elongated cushion means have a substantially cylindrical shape with a longitudinal coextensive concave wall corresponding to said inner surface.

5. The fender set forth in claim 1, wherein said means for fastening said slap members includes lace means and said slap members include a plurality of cooperatively positioned snap button assemblies thereby fastening said slap members together and against each other embracing said post.

6. The fender set forth in claim 5 wherein said elongated cushion means have a substantially cylindrical shape with a longitudinal coextensive concave wall corresponding to said inner surface.

7. The fender set forth in claim 6 wherein said elongated cushion means is filled with air.

8. The fender set forth in claim 7 wherein said elongated cushion means is made out of a soft sponge like material.

* * * * *